(12) United States Patent
Honma et al.

(10) Patent No.: US 8,312,162 B2
(45) Date of Patent: Nov. 13, 2012

(54) INFORMATION PROCESSING APPARATUS AND INFORMATION PROCESSING METHOD

(75) Inventors: Tsuyoshi Honma, Tokyo (JP); Akihiko Kinoshita, Tokyo (JP); Hiroyuki Chiba, Kanagawa (JP); Takashi Miura, Kanagawa (JP)

(73) Assignee: Sony Corporation, Tokyo (JP)

( * ) Notice: Subject to any disclaimer, the term of this patent is extended or adjusted under 35 U.S.C. 154(b) by 140 days.

(21) Appl. No.: 12/869,153

(22) Filed: Aug. 26, 2010

(65) Prior Publication Data
US 2011/0078324 A1    Mar. 31, 2011

(30) Foreign Application Priority Data

Sep. 29, 2009  (JP) ................ 2009-224011

(51) Int. Cl.
*G06F 15/16* (2006.01)
(52) U.S. Cl. .......... 709/231; 709/203; 709/213
(58) Field of Classification Search .......... 709/203, 709/213, 231
See application file for complete search history.

(56) References Cited

U.S. PATENT DOCUMENTS

| 6,785,659 B1* | 8/2004 | Landsman et al. ........... 709/200 |
| 2007/0107036 A1 | 5/2007 | Chen et al. |
| 2008/0022007 A1* | 1/2008 | Hostyn et al. ................ 709/231 |
| 2010/0268836 A1* | 10/2010 | Jabri et al. .................... 709/231 |
| 2011/0231520 A1* | 9/2011 | Ha et al. ........................ 709/219 |

FOREIGN PATENT DOCUMENTS

JP   2007-515108   6/2007

* cited by examiner

*Primary Examiner* — Phuoc Nguyen
(74) *Attorney, Agent, or Firm* — Oblon, Spivak, McClelland, Maier & Neustadt, L.L.P.

(57) ABSTRACT

There is provided an information processing apparatus including a communication unit which communicates with a distribution server that contains content data for streaming delivery, a buffer unit which temporarily stores stream data obtained from the distribution server, a storage unit which stores an inserting content, a reproduction unit which reproduces the content inserted by the storage unit, and a control unit which measures a bandwidth of the network, determines whether it is possible to reproduce until the end of a next chapter defined by a chapter point set in the content based on a buffer volume of the buffer unit and the bandwidth, and when determined it is impossible, switches the content to be produced by the reproduction unit to the inserting content.

14 Claims, 6 Drawing Sheets

INFORMATION PROCESSING APPARATUS AND INFORMATION PROCESSING METHOD

BACKGROUND OF THE INVENTION

1. Field of the Invention

The present invention relates to an information processing apparatus and an information processing method, specifically it relates to the information processing apparatus and the information processing method to execute streaming reproduction.

2. Description of the Related Art

Recently, there have been more opportunities to view contents such as movie, audio or the like via network. Especially the content like movie has a large data size, and so it takes a long time to download a whole data file before reproducing. Therefore, in many cases streaming reproduction is used in which data is reproducing while being transferred.

At this time, network bandwidth used for data transfer is fluid in changing due to various factors. Therefore, a client side of the streaming reproduction uses buffer to absorb effects of this change of the bandwidth on reproduction of content to some extent. However, even though a buffer is in use, reproduction of content may be interrupted due to a rapid change in the network bandwidth, and this deteriorates usability.

Thus, JP 2007-515108 A, for example, discloses a system which reproduces a program prepared in advance which has a certain broadcast quality, such as an advertisement, when a reproduction quality of content falls lower than a predetermined value.

SUMMARY OF THE INVENTION

However, it is not always a scene of the content being reproduced which is good to be interrupted when the reproduction quality of the content falls lower than the predetermined value, and there has been a problem that a user may feel stress from switching content to be reproduced all of sudden. Particularly in case of movie content, there may be a specific scene to be prevented from being interrupted depending upon a story line. Therefore, a timing to switch the content being reproduced is preferably at a time good to be interrupted.

In light of the foregoing, it is desirable to provide an information processing apparatus and an information processing method, which are noble and improved, and which are capable of switching a content being reproduced to a local content at a timing good to be interrupted in terms of a story of the reproduction content when a reproduction quality is deteriorated in streaming reproduction.

According to an embodiment of the present invention, there is provided an information processing apparatus including a communication unit which is capable of communicating via network with a distribution server that contains content data for streaming delivery, a buffer unit which temporarily stores stream data obtained from the distribution server, a storage unit which stores an inserting content, a reproduction unit which reproduces the stream data input by the buffer unit or the inserting content input by the storage unit, and a control unit which, while controlling the buffer unit to store the stream data that is received, controls the reproduction unit to reproduce the stream data, measures a bandwidth of the network, and switches the content to be reproduced by the reproduction unit into the inserting content at the chapter point depending upon whether it is possible to reproduce until the end of a next chapter defined by a chapter point set in the content based on a buffer volume of the buffer unit and the bandwidth.

In this configuration, in a case where the reproduction is to stop in the middle of streaming reproduction due to a lack of buffer volume, stress the user feels from waiting for buffer-accumulation can be reduced by reproducing an inserting content in stead. At this time, the content being reproduced is to be switched at a chapter point which is a separator of the chapter, considering chapter information of the content being streaming. If the content being reproduced is switched without considering a story or a scene of the content being reproduced, the user may feel stress. On the contrary, if the content being reproduced is switched at a chapter point set on a point good to be interrupted in terms of a story or a scene of the content, the user who views the content can continue to view without stress as though it is a case where a program is switched to a commercial message (CM) on the television, for example.

The control unit may wait for a chapter point of the inserting content after the buffer volume becomes larger than a buffer threshold at a time of reproduction of the inserting content, and may switch to reproducing the stream data stored in the buffer unit.

The control unit may obtain data information including reproduction time and data volume of the content from the distribution server, and may set the buffer threshold based on the data information and the bandwidth before starting reproduction of the content.

The control unit may reset the buffer threshold based on the data information and the bandwidth depending on a change of the bandwidth.

The control unit may calculate a buffer time necessary for the buffer volume to be larger than the buffer threshold based on the buffer volume and the bandwidth, and may select the inserting content based on the buffer time.

The content data may be separated into a plurality of chapters based on chapter points set in the content in advance.

The content data may be separated into a plurality of chapters based on chapter points created by unspecified users.

According to another embodiment of the present invention, there is provided an information processing method wherein a control unit of an information processing apparatus includes a communication unit which is capable of communicating via network with a distribution server that contains content data for streaming delivery, a buffer unit which temporarily stores stream data obtained from the distribution server, a storage unit which stores an inserting content, a reproduction unit which reproduces the stream data input by the buffer unit or the inserting content input by the storage unit, and a control unit, including the steps of controlling the reproduction unit to reproduce the stream data while controlling the buffer unit to store the stream data that is received, measuring a bandwidth of the network, determining whether it is possible to reproduce until a next chapter point indicated in chapter information set in the content based on a buffer volume of the buffer unit and the bandwidth, and switching the content to be reproduced by the reproduction unit to the inserting content at the chapter point when determined that it is impossible in the step of determination.

According to the embodiments of the present invention described above, it becomes possible to switch a content being reproduced to a local content at timing good to be interrupted in terms of a story of the reproduction content, when a reproduction quality deteriorated in streaming reproduction.

DETAILED DESCRIPTION OF THE EMBODIMENT(S)

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

1. The functional configuration of the information processing apparatus
2. The operation of the information processing apparatus <1. The Functional Configuration of the Information Processing Apparatus>

Figure 1:
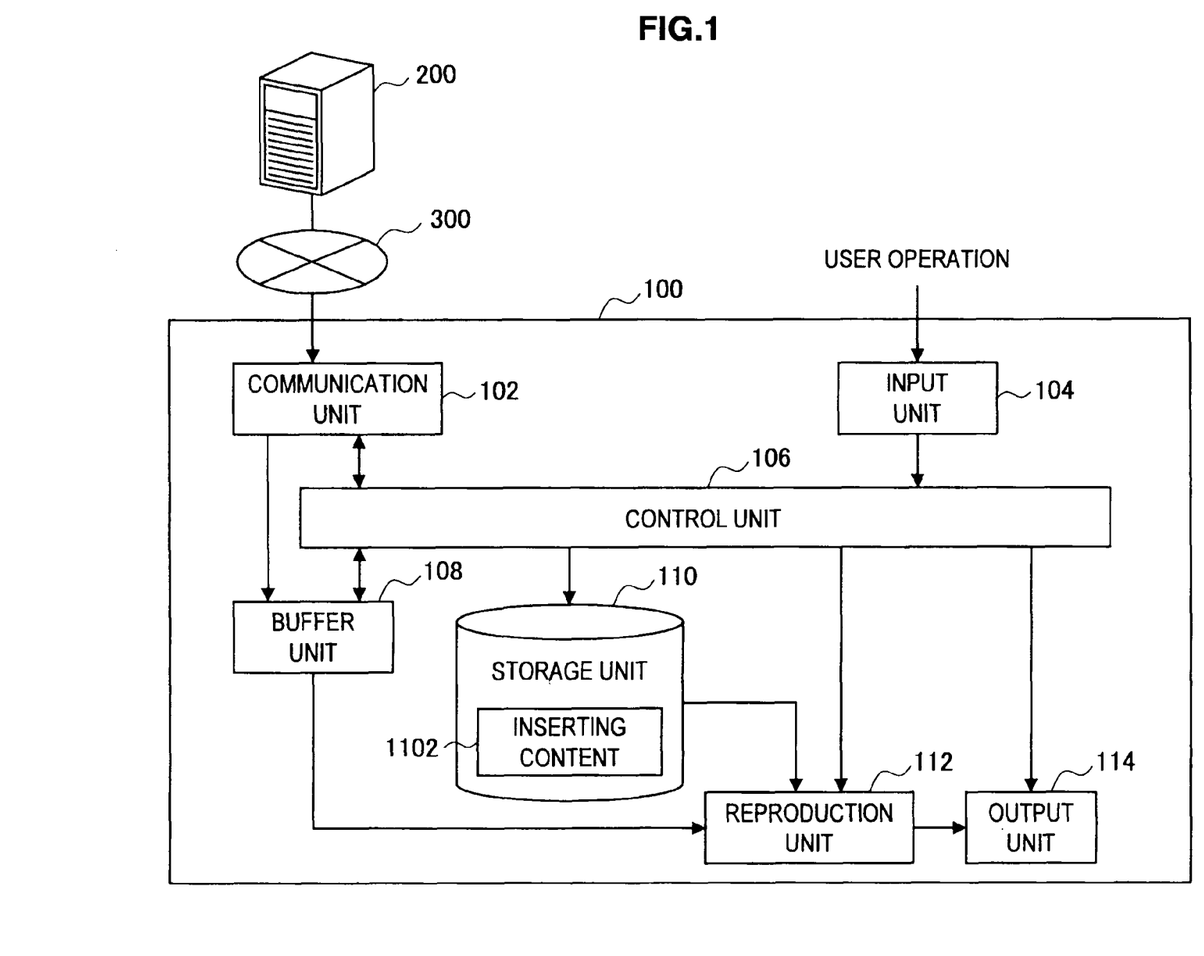
FIG. 1 is a block diagram showing a function configuration of an information processing apparatus according to an embodiment of the present invention.

At first, the functional configuration of the information processing apparatus according to an embodiment of the present invention will be explained with reference to FIG. 1. FIG. 1 is a block diagram showing a function configuration of an information processing apparatus according to an embodiment of the present invention.

An information processing apparatus 100 according to the present embodiment is connected to a distribution server 200 via a network 300. The information processing apparatus 100 may be, for example, a display device such as a digital television, a recording and reproducing device such as a video player, a video cassette recorder, a hard disk drive (HDD) recorder, a digital versatile disc (DVD) player, a DVD recorder, a device that is capable of receiving television broadcasting or reproducing a content recorded, such as a cellar phone, a computer, a PDA (personal digital assistant, an audio player, or the like.

Here, the network is a wired or wireless transmission path. For example, the network may include a public network such as a telephone network, a satellite network, or the Internet, various local area networks (LANs) including Ethernet (registered trademark), a wide area network (WAN), an internet protocol-virtual private network (IP-VPN) or the like.

The distribution server 200 contains content data capable of being distributed by streaming, and can provide stream data by request from a client. The distribution server 100 can function as a client of the distribution server 200.

The information processing apparatus 100 mainly includes a communication unit 102, an input unit 104, a control unit 106, a buffer unit 108, a storage unit 110, a reproduction unit 112, and an output unit 114.

(The Communication Unit 102)

The communication unit 102 is a network interface between the information processing apparatus 100 and the network 300. The communication unit 102 is capable of communicating via network 300 with a distribution server 200 that contains content data for streaming delivery.

(The Input Unit 104)

The input unit 104 has a function to input operations which a user performs to the information processing apparatus 100. The input unit 104 may be an operation input device such as a key board, a mouse or the like, a button, a direction key, a rotary selector such as a jog dial, or any combinations thereof, but it is not limited thereto. Moreover, the input unit 104 may be, for example, a connection interface with the devices above.

(The Control Unit 106)

The control unit 106 has a function to control an entire operation of each unit of the information processing apparatus 100. For example, the control unit 106 controls operations of the communication unit 102, the input unit 104, the buffer unit 108, the storage unit 110, the reproduction unit 112, and the output unit 114. In the present embodiment of the present invention, the control unit 106 requests the distribution server 200 to stream certain content data in accordance with an operation input by a user using the input unit 104, controls obtaining stream data of the content data for streaming delivery from the distribution server 200 via the network 300 and the communication unit 102, and controls streaming reproduction controlling the reproduction unit 112 to reproduce the obtained stream data while controlling the buffer unit 108 to store the obtained stream data.

The control unit 106 measures a bandwidth of the network 300. Here, the bandwidth of the network 300 may be measured, for example, by the time for transferring data and the volume of data thereof. In the present embodiment of the present invention, a bandwidth is used, as in general, as nearly synonymous term with a transfer speed. Further, the control unit 106 has a function to measure a buffer volume of the buffer unit 108.

Then the control unit 106 determines, at a point to be interrupted (hereinafter referred to as a chapter point) indicated in the chapter information set in the content being streamed, whether it is possible to reproduce until the next chapter point based on the buffer volume and the bandwidth of the network 300. For example, the control unit 106 calculates a time when the buffer volume becomes 0 using a change rate (a differential value) of the buffer volume at the chapter point, and determines from this calculated time and a relationship with the next chapter point. If determined as impossible in this determination, that is a case where the remaining buffer volume and the data volume transferred at the current transfer speed cannot catch up with a reproduction speed, the control unit 106 switches the content to be reproduced by the reproduction unit 112 from the content being streaming to an inserting content 1102 that is stored in the storage unit 110.

Here a chapter is a cluster of data which is separated at a chapter point that is information for a time to be interrupted set in a video data. Since the chapter is often set on a changing point of a scene or a story, the chapter is used by a user usually as if a function of a table of contents to reproduce starting from an arbitrary scene. In general, the chapter is defined by chapter data set by a creator of the content, however, in the present embodiment, it is not limited to this. For example, a chapter point set by an unspecified user may be used for a user-creation type of service, or a chapter point set by the user of the information processing apparatus 100 may be used.

Thus, by switching temporarily the content to be reproduced to the inserting content 1102 stored locally, the control unit 106 restores the buffer volume while leading the inserting content 1102 to be reproduced. At this time, switching the content to be reproduced is executed at a chapter point. Since this enables switching at a point good to be interrupted in terms of a story line of the content, the user viewing the content will feel less stress.

Moreover, the control unit may wait for the next chapter point before switching to the reproduction of the stream data stored in the buffer unit 108, when the chapter point is set in the inserting content after the buffer volume becomes larger than a buffer threshold while reproducing the inserting content.

Moreover, the control unit 106 obtains data information including reproduction time and data volume of the content to be streamed from the distribution server 200, and may set a target value for accumulation of buffer and a buffer threshold capable to be a reference based on the data information and the bandwidth of the network 300. The control unit 106 may set this buffer threshold before reproduction starts, or may reset the buffer threshold in accordance with a change of the bandwidth. It may also be set in accordance with a user operation.

The control unit 106 may calculate, based on the bandwidth, a buffer time that is a time for data to be accumulated from the current buffer volume to the buffer threshold using the buffer threshold. The control unit 106 may select the inserting contents in accordance with this buffer time. For example, the control unit 106 may select an inserting content whose length is same as the buffer time, or may combine a plurality of inserting contents to reproduce within the buffer time.

(The Buffer Unit 108)

The buffer unit 108 is a temporary storage which may be, for example, a magnetic recording medium such as HDD (hard disk drive), nonvolatile memory such as EEPROM (Electrically Erasable and Programmable Read Only Memory), flash memory, MRAM (Magnetoresistive Random Access Memory), FeRAM (Ferroelectric Random Access Memory) or PRAM (Phase-change Random Access Memory) or the like, though not limited thereto. The speed of stream data input from the distribution server 200 via the network 300 is not necessarily identical to the reproduction speed. Therefore, in order to compensate this difference in speed, the buffer unit 108 has a function to store temporarily the stream data that is obtained from the distribution server 200. The amount of data actually stored at a time in the buffer unit 108 is called a buffer volume.

(The Storage Unit 110)

The storage unit 110 is a storage medium capable of storing data. The storage unit 110 may be, for example, a magnetic recording medium such as HDD (hard disk drive), nonvolatile memory such as EEPROM (Electrically Erasable and Programmable Read Only Memory), flash memory, MRAM (Magnetoresistive Random Access Memory), FeRAM (Ferroelectric Random Access Memory) or PRAM (Phase-change Random Access Memory) or the like, though not limited thereto. In the present embodiment, the storage unit 110 stores the inserting content 1102.

The inserting content 1102 is movie content. The inserting content 1102 is downloaded when there is vacant bandwidth in the network 300 and stored as local content separately from the stream data. Then the inserting content 1102 can be reproduced as a substitute of stream data when the streaming reproduction is stopped. Since the inserting content 1102 is pre-downloaded content, it is reproduced as movie image of the same quality no matter how the bandwidth status of the network 300 is like at a time of reproducing. Moreover, the inserting content 1102 may be, for example, a movie image such as a movie preview, advertisement, or the like. Further, it may be a movie image selected according to preference information of the movie images the user usually views.

(The Reproduction Unit 112)

The reproduction unit 112 has a function to reproduce (decode) input data. The reproduction unit 112 reproduces the input data in a format capable of outputting as movie image. In the present embodiment, the stream data buffered in the buffer unit 108 or the inserting content 1102 stored in the storage unit 110 is input in the reproduction unit 112 according to the control of the control unit 106.

(The Output Unit 114)

The output unit 114 outputs data that is reproduced in the reproduction unit 112. For example, the output unit 114 is an output device such as a display and a speaker which outputs reproduced data. The output unit 114 may be an interface with the output device.

<2. The Operation of the Information Processing Apparatus>

Figure 2:
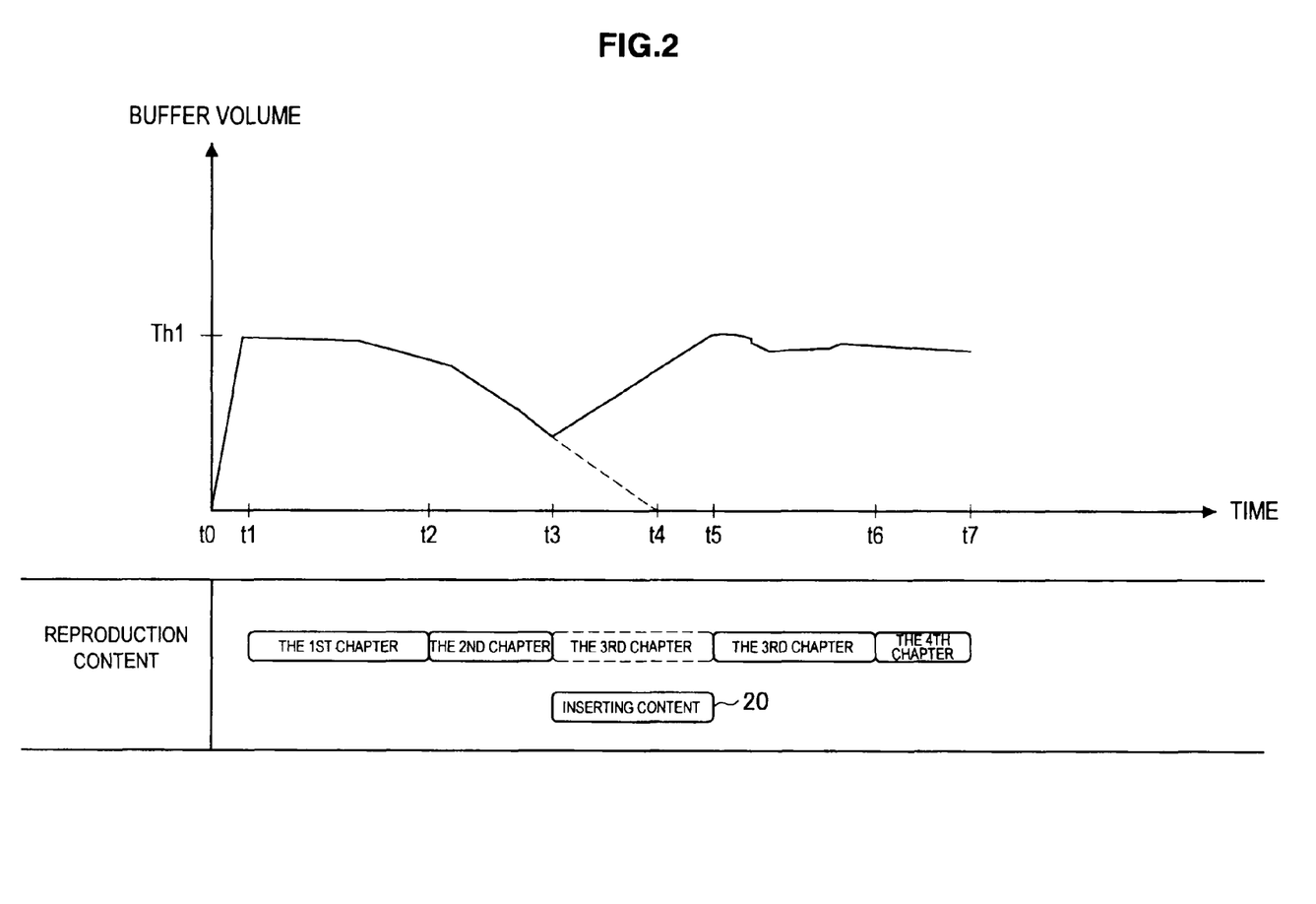
FIG. 2 is an explanatory diagram showing an example of relationship between buffer volume and reproduction content according to the embodiment of the present invention.
Figure 3:
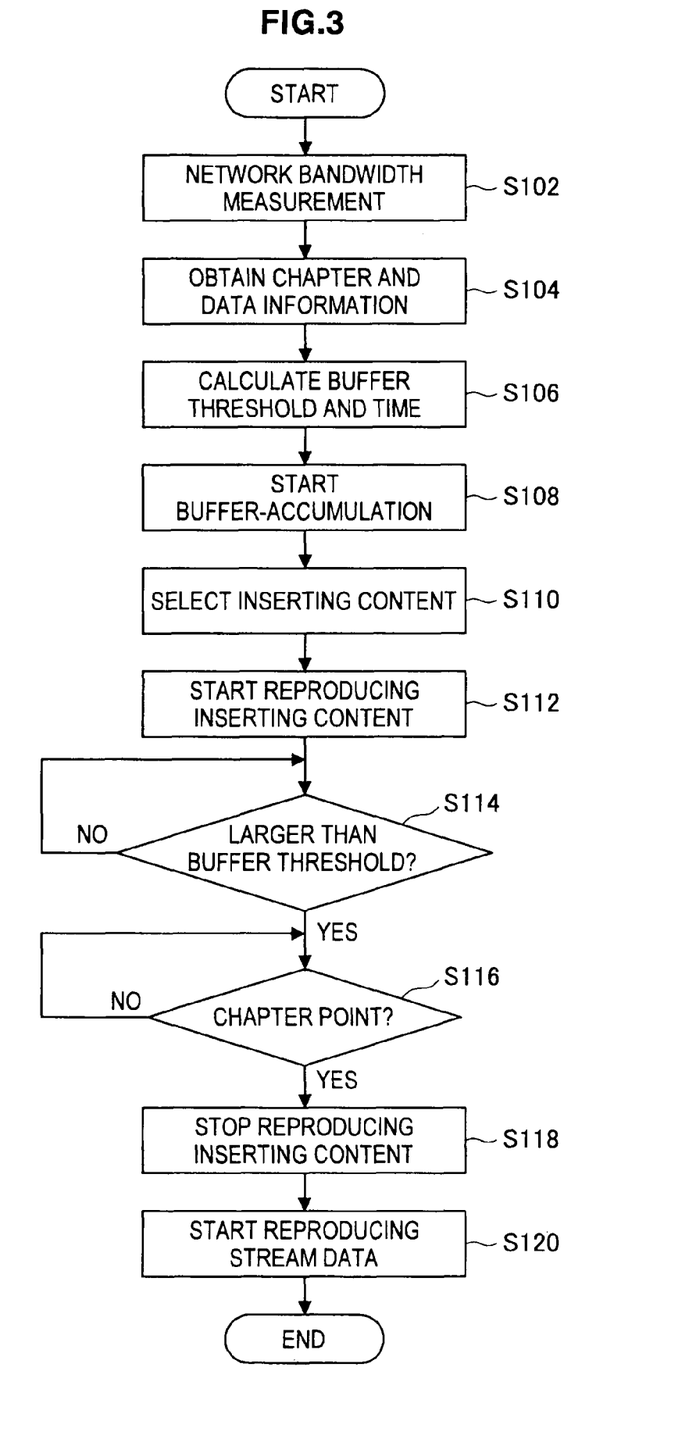
FIG. 3 is a flow chart showing an operation of the information processing apparatus at a time of starting reproduction according to the embodiment of the present invention.
Figure 4:
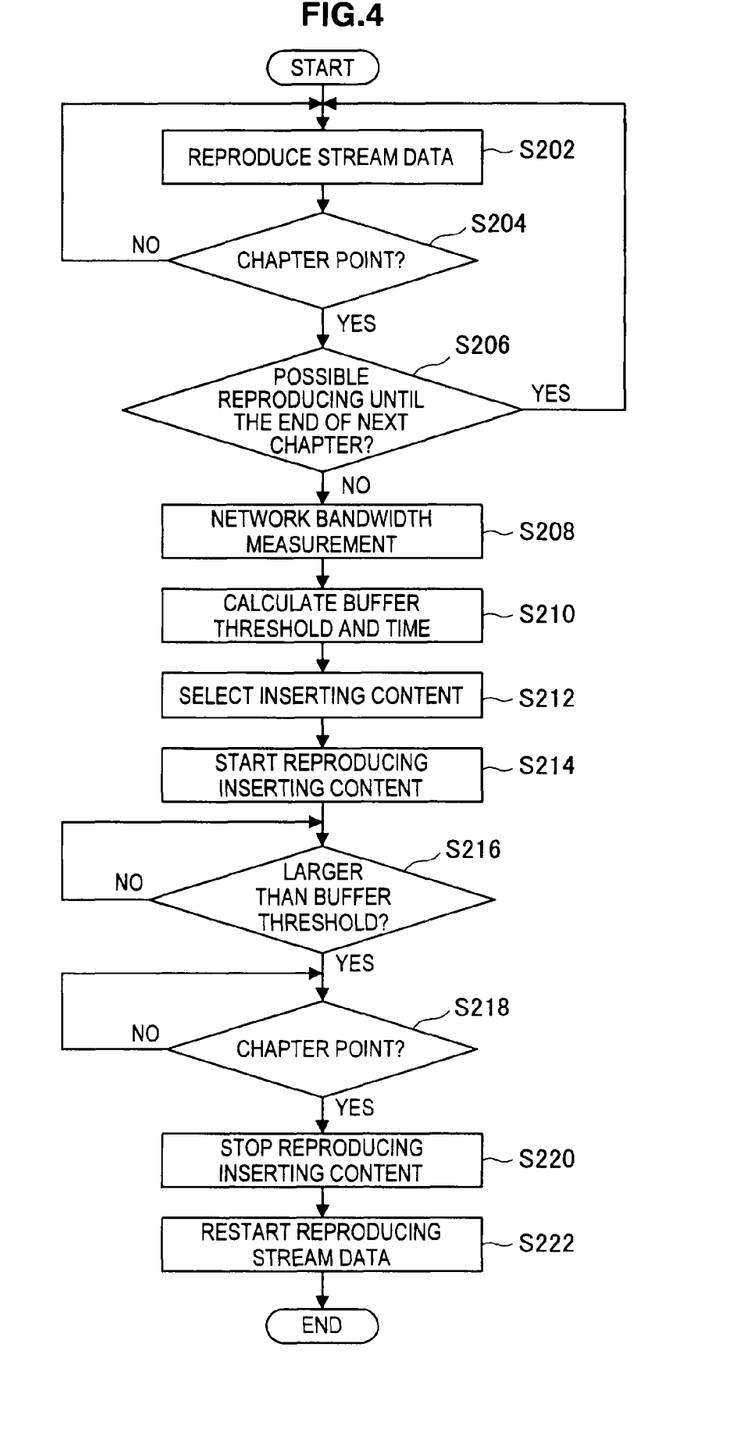
FIG. 4 is a flow chart showing an operation of the information processing apparatus at a time of switching reproduction content according to the embodiment of the present invention.

Next, with reference to FIG. 2 to FIG. 4, an operation of the information processing apparatus according to an embodiment of the present invention will be explained. FIG. 2 is an explanatory diagram showing an example of relationship between buffer volume and reproduction content according to the embodiment of the present invention. FIG. 3 is an explanatory diagram showing an operation of the information processing apparatus at a time of starting reproduction according to the embodiment of the present invention. FIG. 4 is an explanatory diagram showing an operation of the information processing apparatus at a time of switching reproduction content according to the embodiment of the present invention.

First, the operation at a time of starting will be explained with reference to FIG. 2 and FIG. 3. When a user performs an operation to specify content that the user prefers to reproduce, the control unit 106 of the information processing apparatus 100 measures the network bandwidth (S102). Then the control unit 106 transmits a request for reproducing the specified content to the distribution server 200, and obtains chapter information and data information from the distribution server 200 (S104). Here, the data information means, for example, information on reproducing time, reproducing quality (reproducing bit rate), a title, or the like of the content to be reproduced. Then, the control unit 106 calculates a threshold of buffer volume necessary for streaming reproduction, and time for accumulating the buffer to the threshold (S106). After that, the control unit 106 starts an accumulation buffer (S108). Referring to a graph in FIG. 2, the accumulation buffer is started at t0.

In step S106, the control unit 106 determines dynamically the buffer threshold using the bandwidth and the data information before the viewing starts so as to minimize a reproducing stop due to a buffer shortage while viewing.

Then, when the inserting content is to be reproduced during the time t0 until t1 when the buffer volume is accumulated to the buffer threshold Th1, the inserting content is selected (S110) and reproduction of the inserting content is started (S112). The inserting content may be selected depending on the buffer time. Further, the reproduction of the inserting content before the reproducing may be omitted, and the inserting content may be reproduced, for example, when the time for accumulation buffer to the buffer threshold, which is calculated in step 106, is more than the predetermined period of time.

Then the control unit 106 determines whether the buffer volume becomes more than the buffer threshold or not (S114). If more than the buffer threshold, the control unit 106 waits for the chapter point for the inserting content (S116), and stops the reproduction of the inserting content (S118). Here, if there is no chapter point for the inserting content, the reproduction of the inserting content may be stopped immediately, or the reproduction may be stopped after reproducing by the end of the inserting content, for example. Then the control unit 106 directs the reproduction unit 112 to start reproducing the stream data accumulated in the buffer unit 108 (S120).

The streaming reproduction starts as described above. The inserting content may be reproduced while accumulating the buffer before the streaming reproduction starts, instead, so that a user who views will not feel bored during buffering. Especially in recent years, data amount per a unit of time necessary to reproduce has been increased due to the improvement in the quality of movie image. For that reason, when a user with insufficient network bandwidth views, the buffer accumulation time will be increased. The information processing apparatus according to the present embodiment effectively utilizes the buffer accumulation time to improve the satisfaction of the user who views, by letting the user view another movie while accumulating the buffer.

Next, an operation when detected a shortage of the buffer volume will be explained with reference to FIG. 2 and FIG. 4. In the operation before the reproducing described above, the control unit 106 of the information processing apparatus 100 controls to minimize the reproducing stop during the streaming reproduction by calculating to determine the buffer threshold before reproducing. However, the bandwidth of the network 300 is constantly changing unless a user occupies the network 300. When a lot of people share the network bandwidth, the network bandwidth is changing due to various factors, and the change is not what each of individual users can control. Therefore, even though a preferable buffer threshold would have been determined before streaming reproduction, a buffer shortage may occur depending on the later network status thereafter.

Consequently, the information processing apparatus 100 of the present embodiment executes the following operations. First, during streaming reproduction (S202), the control unit 106 determines whether the current position being reproducing is a chapter point (S204). If determined that the current position being reproducing is the chapter point, the control unit 106 determines whether it can reproduce by the end of the next chapter (S206). Calculating the time when the buffer volume becomes 0 using a change rate (a differential value) of the buffer volume at the chapter point (that is t3 in FIG. 2, for example), such determination may be executed depending on the relationship between the calculated time t4 and the next chapter point t5. Here, the determination of step S206 is executed in the chapter point, however, in more precisely, considering the time for calculation and determination in step S206, it may determine in step S204 whether the time is within the predetermined time which is necessary for the calculation and determination, rather than the chapter point, then the processing of step S206 may be executed.

For example, if the determination of step S206 is executed at t1 and t2, in FIG. 2, since it is possible to reproduce by the end of the next chapter, a reproduction of streaming data, step S202 is to be continued. Further, if the determination of step S206 is executed at t3, the control unit 106 determines that it cannot reproduce by the end of the next chapter, and executes the next step of measurement of the network bandwidth (S208). Then the control unit 106 calculates the buffer threshold again based on the measured network bandwidth, and calculates the buffer time for accumulating buffer from the current buffer volume to the buffer threshold (S210). Then the control unit 106 selects the inserting content depending on the calculated buffer time (here, time length between t3 to t5) (S212). Here, the inserting content may be selected based on the preference information of the user who is viewing. Then the control unit 106 directs the start of reproduction of the selected inserting content (S214).

Here, the control unit 106 restores the buffer volume while reproducing the inserting content 20. While reproducing the inserting content 20, since the buffer data is not output only to be accumulated, the buffer volume increases. Then, determining whether the buffer volume exceeds the buffer threshold Th1, the control unit 106 continues to reproduce the inserting content by the time when the buffer volume exceeds the buffer threshold Th1 (S216).

When the buffer volume exceeds the buffer threshold Th1, the control unit 106 stands by until the chapter point of the inserting content 20 (S218). The control unit 106 stops the reproducing of the inserting content at the chapter point of the inserting content, and re-starts the reproduction of the stream data (S222). At this time, the stream data is restarted to be reproduced from the subsequent chapter. The information processing apparatus 100 of the present embodiment is not limited to the above case shown in step 218 where the control unit 106 stands by until the chapter point of the inserting content. If there is no chapter point set in the inserting content, the control unit 106 may switch to the reproducing the stream data, immediately or after reproducing by the end of the inserting content.

Figure 5:
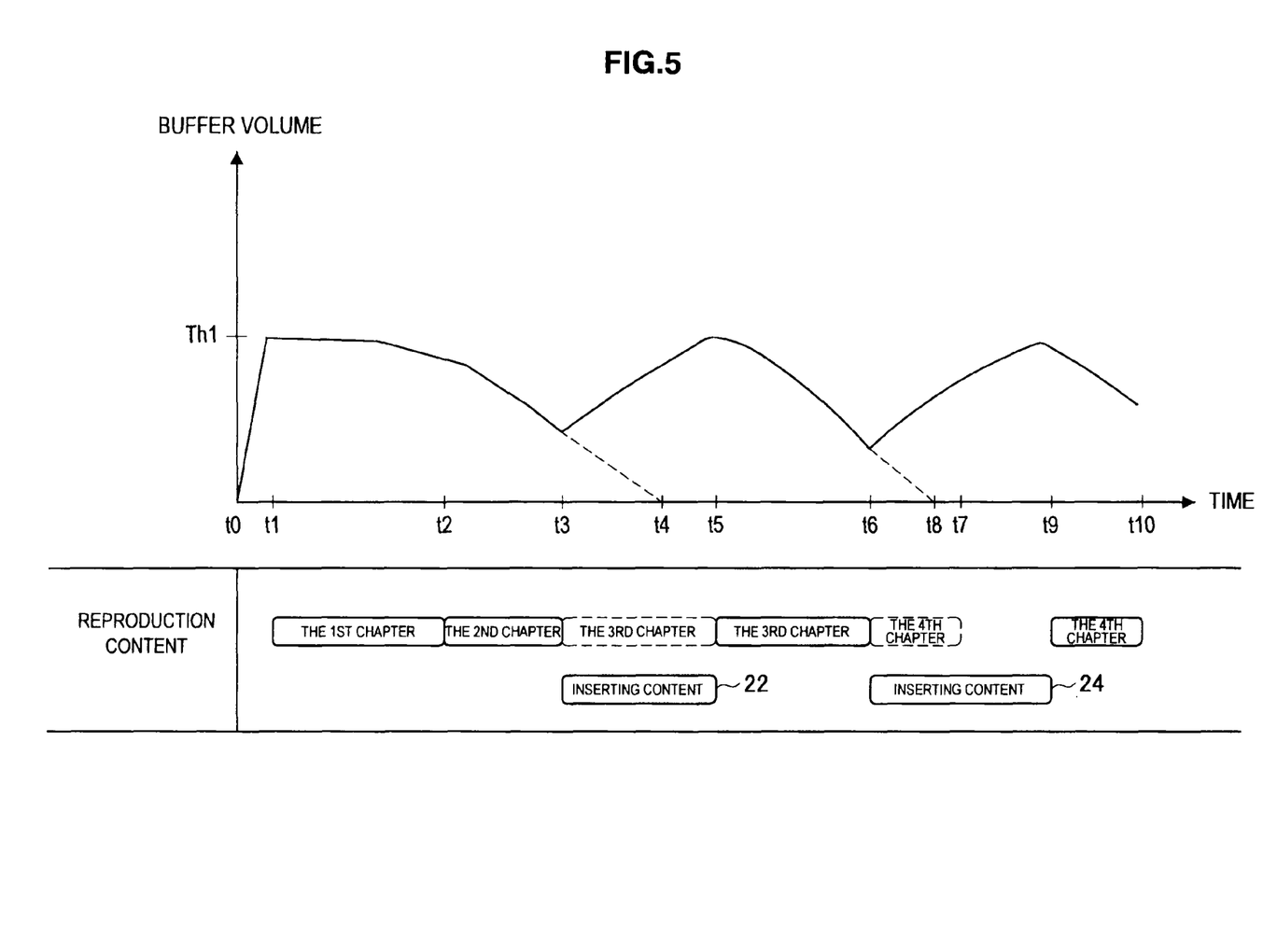
FIG. 5 is an explanatory diagram showing another example of relationship between buffer volume and reproduction content according to the embodiment of the present invention.
Figure 6:
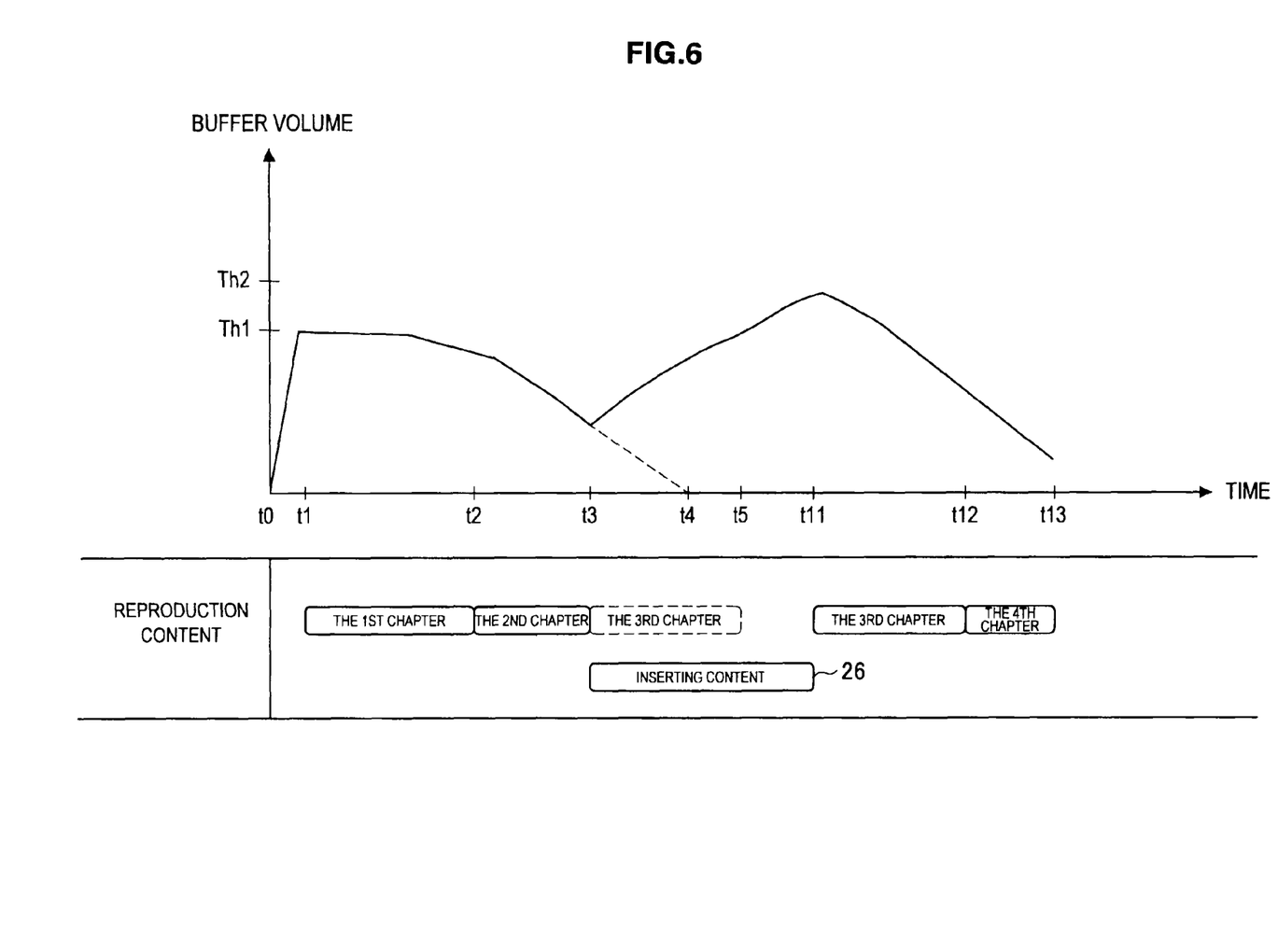
FIG. 6 is an explanatory diagram showing another example of relationship between buffer volume and reproduction content according to the embodiment of the present invention.

Next, with reference to FIGS. 5 and 6, another example of the relationship between the buffer volume and the reproduction content according to the embodiment of the present invention will be indicated to explain an operation in a case where the buffer threshold is variable. FIGS. 5 and 6 are explanatory diagrams showing other examples of relationship between buffer volume and reproduction content according to the embodiment of the present invention.

In FIG. 2, for example, the buffer is accumulated while reproducing the inserting content 20, and the buffer volume increased and decreased around Th1 after it has reached the buffer threshold Th1 at t5. In other words, the example of FIG. 2 is shown a case where the change of the network bandwidth is temporary, and where the bandwidth is enlarged to some extent.

However, in a case where the network bandwidth is not necessarily to be restored, and as shown in FIG. 5, where the bandwidth remains narrow although it restores up to the buffer threshold Th1 once at t5, the buffer volume may decreases since the data volume that is output from the buffer unit 108 remains same while the volume that is input into the buffer unit 108 decreased for a certain period of time. In this case, it is determined that it cannot reproduce until the end of next chapter again at t6, then the inserting content 24 is to be reproduced. Users may feel stress if the reproducing of the content is interrupted and other contents are reproduced while reproducing one content in many times.

Subsequently, the control unit 106 resets the buffer threshold based on the data information and the bandwidth depending on the change in the network bandwidth. FIG. 6 shows the relationship between the buffer volume and the reproduction content when the buffer threshold is reset. If the control unit 106 determines that reproducing the third chapter and the fourth chapter in series is difficult since the bandwidth is extremely low, it raises the buffer threshold from Th1 to Th2. The control unit 106 calculates the buffer time using the newly set buffer threshold Th2. Then the control unit 106 selects the inserting content 26 based on this buffer time.

Thus, by raising the buffer threshold, it is possible to minimize the interruptions of the reproduction even in the case where the bandwidth narrows and the transfer rate of the stream data is extremely low comparing to the reproducing speed of the content.

Another measure for a case where the bandwidth becomes extremely narrow is to lower quality of the stream data to be produced. If the quality of movie image is lowered, the data amount necessary for reproducing per unit of time can be small, and it may be possible to reproduce without interruption even with a narrow bandwidth. In this case, it is necessary to delete the stream data once accumulated in the buffer unit and to accumulate stream data at a newly data rate.

(An Example of the Effect)

As described above, in a case where the reproduction stops in the middle of streaming reproduction due to shortage of buffer volume, the information processing apparatus 100 according to the embodiment of the present invention reproduces the inserting content instead so that the user will not feel any stress from waiting for buffer-accumulation can be reduced. At this time, the content being reproduced is to be switched at a chapter point which is a separator of the chapter, considering chapter information of the content being streaming. If the content being reproduced is switched without considering a story or a scene of the content being reproduced, the user may feel stress. On the contrary, if the content being reproduced is switched at a chapter point set on a point good to be interrupted in terms of a story or a scene of the content, the user who views the content can continue to view without stress as though it is a case where a program is switched to a commercial message on the television, for example.

A preferred embodiment of the present invention has been explained in detail above with reference to the attached drawings, the present invention is not limited to this example. It should be understood by those skilled in the art that various modifications, combinations, sub-combinations and alterations may occur depending on design requirements and other factors insofar as they are within the scope of the appended claims or the equivalents thereof.

For example, in the present embodiment, it is determined at a chapter point (or regularly) whether it is possible to reproduce until the end of next chapter, however, the present embodiment is not limited to this. For example, the control unit 106 may monitor the buffer volume, and determines whether it is possible to reproduce until the end of the next chapter only when the buffer volume becomes less than the predetermined threshold.

In addition, in the present specification, the steps described in the flow chart include not only processing steps carried out in time series in the described order but also processing steps carried out in parallel or individually and not necessarily in time series. Moreover, the order of the processing steps carried out in time series can be also appropriately changed in some cases, of course.

The present application contains subject matter related to that disclosed in Japanese Priority Patent Application JP 2009-224011 filed in the Japan Patent Office on Sep. 29, 2009, the entire content of which is hereby incorporated by reference.

What is claimed is:

1. An information processing apparatus, comprising:
a communication unit which communicates via a network with a distribution server that streams content;
a buffer unit which temporarily stores stream data of the content obtained from the distribution server;
a storage unit which stores an inserting content;
a reproduction unit which reproduces the stream data input by the buffer unit or the inserting content input by the storage unit; and
a control unit which, while controlling the buffer unit to store the stream data that is received, controls the reproduction unit to reproduce the stream data, measures a bandwidth of the network, and switches the reproduction of the stream data to the inserting content at a chapter point depending upon whether the stream data can be reproduced until the end of a next chapter of the content defined by the chapter point set in the content based on a buffer volume of the buffer unit and the bandwidth, wherein
the control unit calculates a buffer time necessary for the buffer volume to be larger than a buffer threshold based on the buffer volume and the bandwidth, and selects the inserting content based on the buffer time.

2. The information processing apparatus according to claim 1, wherein the control unit waits for a chapter point of the inserting content after the buffer volume becomes larger than the buffer threshold at a time of reproduction of the inserting content, and switches to reproducing the stream data stored in the buffer unit after waiting for the chapter point of the inserting content.

3. The information processing apparatus according to claim 2, wherein the control unit obtains data information including a reproduction time and data volume of the content from the distribution server, and sets the buffer threshold based on the data information and the bandwidth before starting reproduction of the content.

4. The information processing apparatus according to claim 3, wherein the control unit resets the buffer threshold based on the data information and the bandwidth depending on a change of the bandwidth.

5. The information processing apparatus according to claim 1, wherein the content is separated into a plurality of chapters based on chapter points set in the content in advance.

6. The information processing apparatus according to claim 1, wherein the content is separated into a plurality of chapters based on chapter points created by unspecified users.

7. An information processing method of an information processing apparatus including a communication unit which communicates via a network with a distribution server that streams content, a buffer unit which temporarily stores stream data of the content obtained from the distribution server, a storage unit which stores an inserting content, a reproduction unit which reproduces the stream data input by the buffer unit or the inserting content input by the storage unit, and a control unit, the method comprising the steps of:
controlling the reproduction unit to reproduce the stream data while controlling the buffer unit to store the stream data that is received;
measuring a bandwidth of the network;
determining whether the stream data can be reproduced until a next chapter point of the content indicated in chapter information set in the content based on a buffer volume of the buffer unit and the bandwidth;

switching, by the control unit of the information processing apparatus, the reproduction of the stream data to the inserting content at a chapter point when the step of determining determines that the stream data cannot be reproduced until the next chapter point; and calculating a buffer time necessary for the buffer volume to be larger than a buffer threshold based on the buffer volume and the bandwidth, and selecting the inserting content based on the buffer time.

8. The information processing apparatus according to claim 1, wherein the control unit switches the reproduction of the stream data to the inserting content at the chapter point depending upon whether the stream data can be continuously reproduced until the end of the next chapter without interruption.

9. The method according to claim 7, further comprising:
waiting for a chapter point of the inserting content after the buffer volume becomes larger than the buffer threshold at a time of reproduction of the inserting content; and
switching to reproducing the stream data stored in the buffer unit after the step of waiting for the chapter point of the inserting content.

10. The method according to claim 9, further comprising:
obtaining data information including a reproduction time and data volume of the content from the distribution server; and
setting the buffer threshold based on the data information and the bandwidth before starting reproduction of the content.

11. The method according to claim 10, further comprising:
resetting the buffer threshold based on the data information and the bandwidth depending on a change of the bandwidth.

12. The method according to claim 7, wherein the content is separated into a plurality of chapters based on chapter points set in the content in advance.

13. The method according to claim 7, wherein the content is separated into a plurality of chapters based on chapter points created by unspecified users.

14. The methods according to claim 7, wherein the step of switching comprises switching the reproduction of the stream data to the inserting content at the chapter point depending upon whether the stream data can be continuously reproduced until the end of the next chapter without interruption.

* * * * *